US010191985B1

(12) United States Patent
Sarshar et al.

(10) Patent No.: US 10,191,985 B1
(45) Date of Patent: Jan. 29, 2019

(54) SYSTEM AND METHOD FOR AUTO-CURATION OF Q AND A WEBSITES FOR SEARCH ENGINE OPTIMIZATION

(71) Applicant: Intuit Inc., Mountain View, CA (US)

(72) Inventors: Nima Sarshar, Morgan Hill, CA (US); Jonathan Goldman, Mountain View, CA (US); Igor A. Podgorny, San Diego, CA (US); Todd Goodyear, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 523 days.

(21) Appl. No.: 14/283,112

(22) Filed: May 20, 2014

(51) Int. Cl.
*G06F 17/30* (2006.01)
(52) U.S. Cl.
CPC .............. *G06F 17/30864* (2013.01)
(58) Field of Classification Search
CPC .................................. G06F 17/30864
USPC ............................................ 707/692
See application file for complete search history.

(56) References Cited

U.S. PATENT DOCUMENTS

| 6,101,489 | A | * | 8/2000 | Lannert | G06Q 10/06393 |
| | | | | | 706/45 |
| 6,134,539 | A | * | 10/2000 | O'Connor | G09B 7/04 |
| | | | | | 706/11 |
| 8,165,997 | B1 | | 4/2012 | Podgorny et al. | |
| 8,180,778 | B1 | * | 5/2012 | Pedersen | G06F 17/3089 |
| | | | | | 707/739 |
| 9,116,983 | B2 | * | 8/2015 | Ameri-Yahia | G06F 17/2785 |
| 9,213,769 | B2 | * | 12/2015 | Stekkelpak | G06F 17/30867 |
| 9,275,038 | B2 | * | 3/2016 | Bierner | G06Q 50/00 |
| 9,904,436 | B2 | * | 2/2018 | Zadeh | G06F 3/0482 |
| 2002/0119434 | A1 | * | 8/2002 | Beams | G09B 7/00 |
| | | | | | 434/322 |
| 2005/0010544 | A1 | * | 1/2005 | Sleat | G06F 19/363 |
| | | | | | 706/46 |
| 2008/0097830 | A1 | * | 4/2008 | Kim | G06Q 30/02 |
| | | | | | 705/14.4 |
| 2009/0226872 | A1 | * | 9/2009 | Gunther | G09B 7/00 |
| | | | | | 434/350 |
| 2011/0022502 | A1 | * | 1/2011 | Evans | G06Q 10/10 |
| | | | | | 705/31 |
| 2011/0275047 | A1 | * | 11/2011 | Gomes | G09B 7/02 |
| | | | | | 434/350 |
| 2012/0290661 | A1 | * | 11/2012 | Kersh | G06Q 10/107 |
| | | | | | 709/205 |

(Continued)

OTHER PUBLICATIONS

Predicting purchasing behavior throughout the clickstream, by Ruud Verheijden, Nov. 9, 2012.*

(Continued)

*Primary Examiner* — Jean M Corrielus
(74) *Attorney, Agent, or Firm* — DLA Piper LLP US

(57) ABSTRACT

A computer-implemented method of generating rich content webpages from a question and answer (Q&A) library includes providing a topic and one or more seed questions related to the topic. The computing device searches the one or more seed questions against all questions in the Q&A library and identifies questions related to the topic. The computing device clusters the text of the questions related to the topic into a plurality of clusters and then removes substantial duplicates from the plurality of clusters. The computing device generates a rich content webpage by aggregating a question from each cluster onto a single webpage containing the topic.

13 Claims, 7 Drawing Sheets

(56) References Cited

U.S. PATENT DOCUMENTS

| | | | |
|---|---|---|---|
| 2013/0103420 A1* | 4/2013 | Massoumi | G06F 19/363 705/3 |
| 2013/0212059 A1* | 8/2013 | Ameri-Yahia | G06F 17/30713 706/52 |
| 2013/0252221 A1* | 9/2013 | McNutt | G09B 7/00 434/350 |
| 2013/0262258 A1* | 10/2013 | Jennings | G06Q 30/0601 705/26.4 |
| 2013/0297545 A1* | 11/2013 | Bierner | G06F 17/2775 706/46 |
| 2013/0309645 A1* | 11/2013 | Billinge | G09B 7/00 434/350 |
| 2013/0339333 A1* | 12/2013 | Stekkelpak | G06F 17/30867 707/706 |
| 2014/0136506 A1* | 5/2014 | Ratner | G06Q 30/0256 707/706 |
| 2014/0222702 A1* | 8/2014 | Jennings | G06Q 50/01 705/319 |
| 2014/0244429 A1* | 8/2014 | Clayton | G06Q 30/0631 705/26.7 |
| 2014/0244447 A1* | 8/2014 | Kim | G06Q 30/0643 705/27.2 |
| 2014/0244488 A1* | 8/2014 | Kim | G06Q 20/02 705/39 |
| 2015/0120718 A1* | 4/2015 | Luo | G06F 17/30699 707/728 |
| 2015/0127340 A1* | 5/2015 | Epshteyn | G10L 15/26 704/235 |
| 2015/0178853 A1* | 6/2015 | Byron | G06Q 40/12 705/30 |
| 2015/0186515 A1* | 7/2015 | Rao | G06F 17/30864 707/610 |
| 2015/0193798 A1* | 7/2015 | Poreh | G06Q 30/0206 705/7.31 |
| 2015/0317382 A1* | 11/2015 | O'Malley | G06F 17/30876 707/738 |
| 2016/0063552 A1* | 3/2016 | Stekkelpak | G06F 17/30867 705/14.54 |

OTHER PUBLICATIONS

Get answers to ypur tax question, H&R Block, 2013.*
Wikipage Logistic Regression, http://en.wikipedia.org/wiki/Logistic_regression, printed Apr. 15, 2014 (18 pages).
H&R Block webpage, http://www.hrblock.com/get-answers/tax-questions-answers.html, printed Apr. 15, 2014 (6 pages).
AnswerXchange Webpage, https://ttlc.intuit.com/tags/health%20exchange, printed Apr. 15, 2014 (9 pages).
Wikipage Random Forest, http://en.wikipedia.org/wiki/Random_forest, printed Apr. 15, 2014 (6 pages).
Girvan et al. "Community structure in social and biological networks", www.pnas.org/cgi/doi/10.1073/pnas.122653799, vol. 99, No. 12, Jun. 11, 2002 (6 pages).
http://www.mapequation.org/code.html, printed May 14, 2014 (10 pages).

* cited by examiner

Military Spouses and State Taxes

ANSWER TO "MILITARY SPOUSE RESIDENCY QUESTION 22a

Active duty service members have always been able to keep one state as their state of legal residency (usually their Home of Record) for tax purposes even when they move frequently on military orders. A state of legal residence (SLR) is also considered their "domicile" or "resident" state. For more information, see Filing State Income Taxes When You're in the Military. This was not so for the nonmilitary spouse until the Military Spouse Residency Relief Act (MSRRA) was signed in 2009. Since then, a nonmilitary spouse of a service member may be able to keep the same resident state of the military spouse regardless of which state they live in. For more information on how a particular state handles MSRRA, check out Military Filing Information on State Websites.

Was this answer helpful? [✓ Yes] [✗ No]

Military Spouse Residency Question (for topic 24)

My husband and I maintain our state residency in Colorado but are stationed in Washington. I'm attending college here and my car is registered here. I have a Colorado DL however. We also own a home in Colorado. Which state should I claim residency in? WA or CO?

• military spouse residency • 1 answer • last activity 2 months ago • UserID

Military spouse, which state do I choose?

• military spouse state • 2 answers • last activity 6 months ago • Platform (mobile)

Do I have to submit anything when claiming the military spouses residency relief act (for topic 24)

• military spouse residency relief act • 127 people have this question • 1 answer • asked 2 months ago
• closed to replies • UserID how do i amend my 2009 tax return to take advantage of the Military Spouses Residency Relief Act? (for topic 24)

I'm permanently stationed in NC. My wife and I are GA residents. Last year she worked in NC and paid NC taxes while I continued to pay GA taxes. How can I take advantage of the Military Spouses Residency Relief Act and get the taxes I paid NC last year back? How do I go about paying the GA taxes to make up for my wife's income not being taxed in NC?

• amend, military spouse residency • 2 answers • last activity 8 months ago • UserID

SYSTEM AND METHOD FOR AUTO-CURATION OF Q AND A WEBSITES FOR SEARCH ENGINE OPTIMIZATION

SUMMARY

In one embodiment, a computer-implemented method of generating rich content webpages from a question and answer (Q&A) library includes providing a topic and one or more seed questions related to the topic. The computing device searches the one or more seed questions against all questions in the Q&A library and identifies questions related to the topic. The computing device clusters the text of the questions related to the topic into a plurality of clusters and then removes substantial duplicates from the plurality of clusters. Dead content may be optionally removed. The computing device generates a rich content webpage by aggregating a question from each cluster onto a single webpage containing the topic.

In another embodiment, a computer-implemented method of generating rich content webpages from a question and answer (Q&A) library includes a computing device analyzing the click history of a plurality of users of questions contained within the Q&A library and generating a click graph comprising related questions obtained from co-clicks by users. The computing device clusters the click graph and selects a plurality of seed questions from the clustered click graph, wherein the selection corresponds to a plurality of seed questions related to a common topic. The computing device searches the seed questions against all questions in the library and identifying questions related to the common topic. The computing device clusters the text of the questions related to the common topic into a plurality of clusters under the common topic and removes substantial duplicates from the plurality of clusters. Optionally, dead questions can be removed. The computing device generating a rich content webpage by aggregating a question from each cluster onto a single webpage containing the common topic.

BRIEF DESCRIPTION OF THE DRAWINGS

FIG. 2 illustrates an example of a landing page for the Q&A website.

DETAILED DESCRIPTION OF ILLUSTRATED EMBODIMENTS

Figure 1:
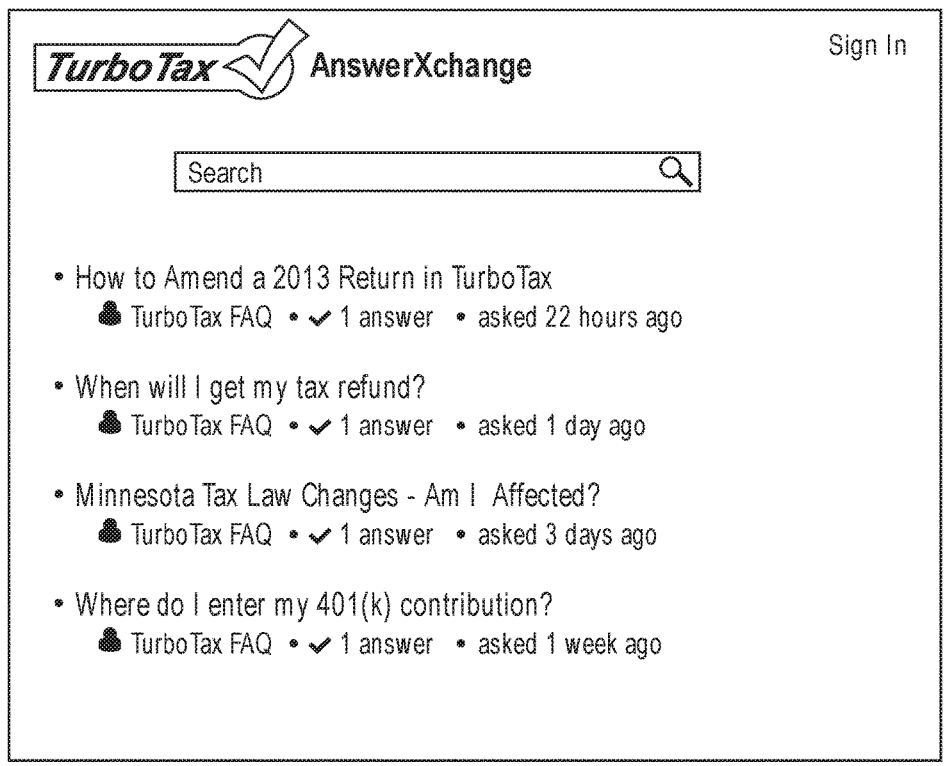
FIG. 1 illustrates an example of a Q&A website, i.e., TURBOTAX ANSWERXCHANGE online forum or website, where both customers and non-customers share questions and answers regarding tax topics.

FIG. 1 illustrates a screen shot of a social question and answer (Q&A) website 10 where users share their collective knowledge on a particular topic of interest. FIG. 1 illustrates an example of the TURBOTAX ANSWERXCHANGE online forum where both customers and non-customers share questions and answers regarding tax topics. TURBOTAX ANSWERXCHANGE is a registered trademark of Intuit Inc., Mountain View, Calif. With continuing reference to FIGS. 1 and 2, the Q&A website 10 may have a number of landing pages 20 on which a user first interacts with the Q&A website 10. A landing page 20 is typically a webpage where a user first interacts with the Q&A website 10 in response to a query made into a search engine. FIG. 2 illustrates an example of a landing page 20 for the Q&A website 10. For example, in one embodiment, a user inputs a search query into search engine such as GOOGLE, BING, YAHOO! search engines that produces a plurality of search results (e.g., website links) that are then presented to the user. GOOGLE is a registered trademark of Google Inc., Mountain View, Calif., BING is a registered trademark of Microsoft Corporation, Redmond, Wash., and YAHOO! is a registered trademark of Yahoo! Inc., Sunnyvale, Calif. Such a search inquiry can be made using a number of different device platforms such as, for instance, a personal computer, laptop, tablet, mobile device, and the like. With continuing reference to FIG. 2, the landing page 20 typically includes a plurality of questions 22 that relate to a common topic 24. In the example illustrated in FIG. 2, a landing page 20 includes questions 22a-d (generally, question 22) pertaining to a common topic 24 of "Military Spouses and State Taxes." The common topic 24 may be optionally expressed textually within the landing page 20 as, for example, a header or even prominently displayed question 22 as seen in FIG. 2. The common topic 24 may be expressed as a sentence, question, or combination of words. Note that each question 22 on the landing page 20 relates, in some respect, to the common topic 24. In the illustrated example, answers 25a-d (generally, answer 25) are associated with respective questions 22a-d. For example, question 22a has "1 answer" 25a, question 22b has "2 answers" 25b, question 22c has "1 answer" 25c and question 22d has "2 answers" 25d. Each question 22 may optionally have associated with it word tags 23 (with reference to question 22c as an example), which can be used to organize or further search related questions 22. An answer 25 may also be illustrated in a paired relationship with one or more of the questions 22 as seen in FIG. 2. For example, as shown in FIG. 2, the landing page 20 includes two answers 25 paired with the question 22b of "Military spouse, which state do I choose?" and one answer 25 paired with the question 22c of "Do I have to submit anything when claiming the military spouses residence relief act." As explained in more detail below, the questions 22 are automatically populated on the landing page 20 using computer-implemented method.

Still referring to FIG. 2, below each question 22 there may be additional information that is displayed to the user viewing the landing page 20. For example, the user ID 26 of the person that submitted the question 22 may be displayed, or to identify users that have this question, which may be displayed by selecting "+" to display the people having this question 22c. The platform type 28 of the question 22 submitted may also be displayed (e.g., different device platforms such as a personal computer, laptop, tablet, mobile device, and the like). The number of answers 25 to the question 22 may also be presented to the user. Finally, activity information 32 pertaining to a question 22 may also be displayed. Activity information 32 includes the last time an answer 25 was submitted to the question 22 and when the question 22 was asked. Activity information 32 can also reflect that the question 22 is closed to further answers 25. For example, FIG. 2 illustrates activity information 32a-e involving questions 22 of "last activity 2 months ago 32a" (associated with question 22a), "last activity 6 months ago 32b" (associated with question 22b), "asked 2 months ago 32c" and "closed to replies" 32d (associated with question 22c). and "last activity 8 months ago 32e" (associated with question 22d).

In one embodiment of the invention, a method is provided for automatically generating landing pages 20 for a Q&A website 10 that contain rich or robust content therein and thus are more likely to have a higher ranking by the search engine. Such landing pages 20 with higher rankings are more prominently displayed to search engine users (e.g., they appear higher on the list) and are thus more likely to be selected by the user in response to a search engine query. By automatically generating rich content landing pages 20 for the Q&A website 10, additional website traffic may be driven to the Q&A website 10. The Q&A website 10 may include one or more features (e.g., marketing interventions) that can then be used to further drive users to purchase goods or services that are linked or otherwise associated with the Q&A website 10. For example, in the example where the Q&A website 10 is TURBOTAX ANSWERXCHANGE online forum or website, a visitor arriving to this Q&A website 10 from a search engine may be provided the opportunity to purchase tax preparation software such as TURBOTAX tax return computer program. TURBOTAX is a registered trademark of Intuit Inc., Mountain View, Calif. By driving additional traffic to the Q&A website 10, this increases the chances of making such visitors purchase a product or service that is associated with the Q&A website 10.

A Q&A website typically contains separate pages with questions and, in some instances, one or more answers to the submitted question. Taken alone, the webpage with a question and its respective answer(s) is typically referred to as containing "thin" content that does not generate much relevancy from a query submitted by a search engine. Often, however, many different questions and answers may be related to a generic subject or topic. In one aspect of the invention, a computer-implemented method is provided that generates a rich-content landing page 20 from the many "thin" pages contained within a Q&A website 10. The rich-content landing page 20 provides a robust document where a user landing thereon can learn about many different aspects that generally relate to a single topic or subject 24. In this embodiment, the rich-content landing webpage 20, when indexed by a search engine, has a much higher ranking and is thus more likely to be displayed to and visited by a user. Moreover, such landing pages 20 can contain more relevant information for users which provides a better user experience.

Figure 3:
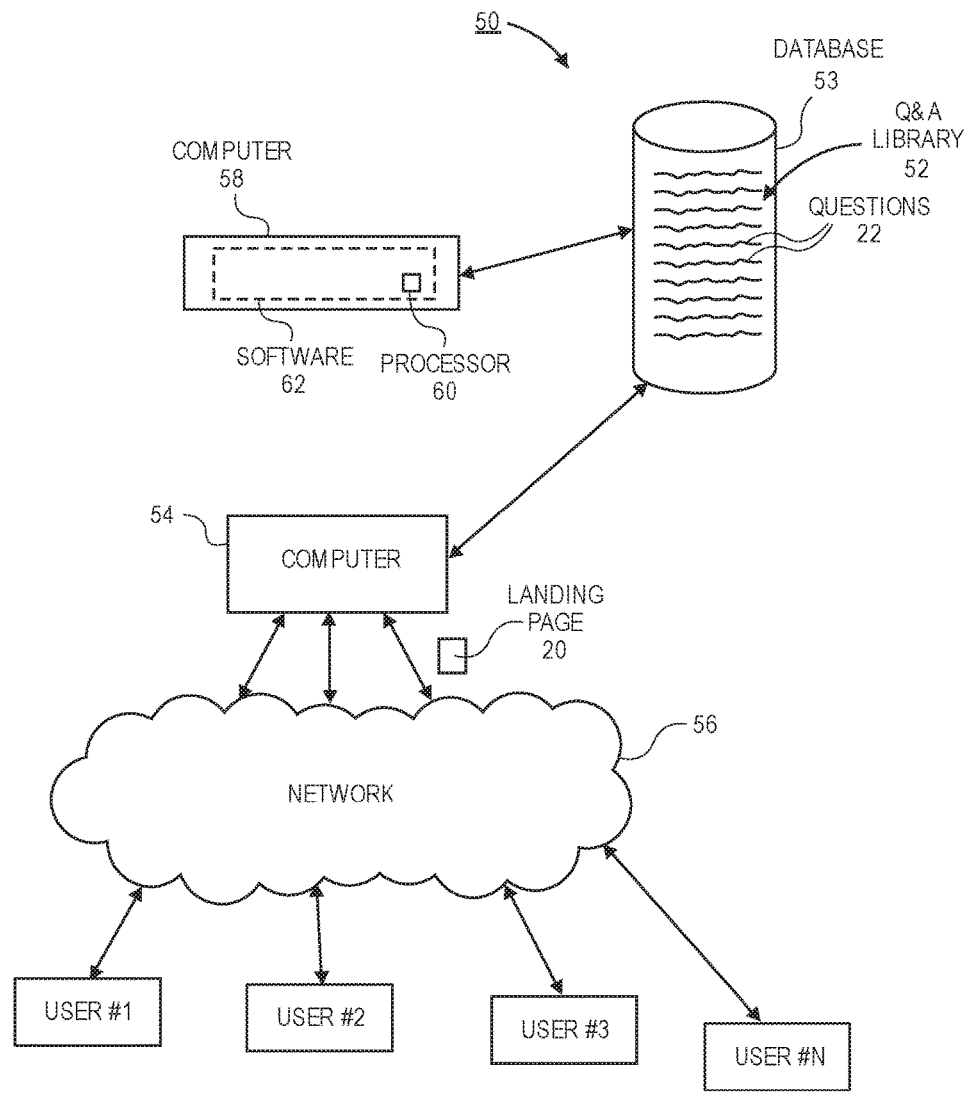
FIG. 3 illustrates one embodiment of the system architecture for auto-curation of a Q&A library.

FIG. 3 illustrates a system 50 that is used as part of the computer-implemented method of generating rich content webpages 20. A question and answer library 52 is maintained, for example, using a computer accessible database 53 that stores questions 22 and corresponding answers 25, if any. The database 53 containing the question and answer library 52 may also include additional information such as user ID 26, platform type 28, number of answers 25, or activity information 32 as discussed above and shown in FIG. 2. In one aspect, the database 53 may also include the click history of some or all of the users accessing the question and answer library 52. The click history, as explained below, is then used to automatically generate common topics 24 amongst the wide variety of questions 22 contained in the question and answer library 52. The database 53 containing the question and answer library 52 is illustrated coupled to a computer 54 such as server that is used to serve webpages to users. As seen in FIG. 3, various Users #1-#N (generally, users) interface with the computer 54 via a wide area network 56 such, for example, the Internet. The computer 54 responds to user requests, which may come through an intermediary such as a search engine, and delivers the landing pages 20 as described herein to the users.

Still referring to FIG. 3, a separate computer 58 may be provided that performs the auto-curation of the Q&A library 52. The computer 58 includes one or more processors 60 therein as well as software 62 that is executed by the one or more processors 60. The computer 58 interfaces with the Q&A library 52 and is configured to generate rich content webpages 20 by aggregating multiple questions 22 related to a single topic 24. The computer 58 preferably does this for a large number of topics 24. For example, a typical Q&A library 52 may be curated to have around several thousand different topics 24 although the invention described herein may be used for any number of different topics 24. In some embodiments, the Q&A library 52 may be auto-curated periodically (e.g., once every month or after several months). In other embodiments, the Q&A library 52 may be auto-curated dynamically as questions 22 are being added to the Q&A library 52. Of course, dynamic auto-curation may demand more computation power and complexity so periodical auto-curations over a relatively short time frame to pick up recently added questions 22 may suffice in most instances.

Figure 4:
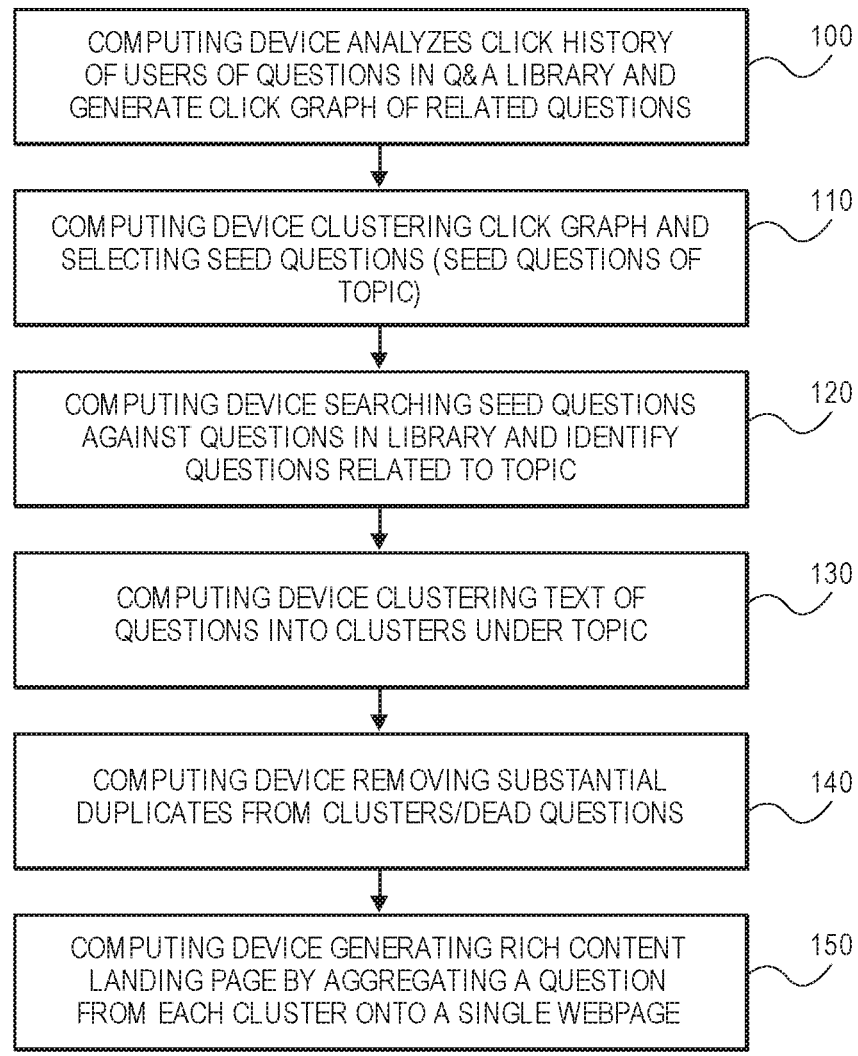
FIG. 4 illustrates a method of auto-curating a Q&A library according to one embodiment.

FIG. 4 illustrates a computer-implemented method of generating rich content webpages 22 from a question and answer library 52 according to one embodiment. In this embodiment, as seen in operation 100, the computer 58 analyzes the click history or past clickstream of users that have accessed the Q&A library 52. The analysis consists of identifying those questions which a single user has clicked on multiple questions 22.

Figure 5:
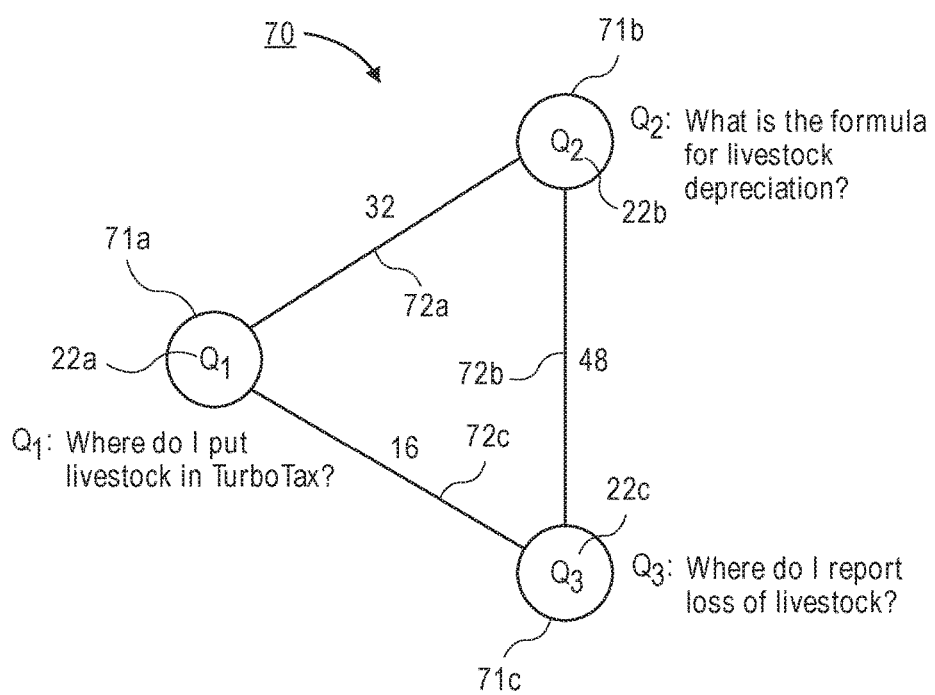
FIG. 5 illustrates a click graph wherein each node is a question and the link between adjacent nodes indicates that a user has clicked on both questions.

With further reference to FIG. 5, the computer 58 also generates a click graph 70 that includes related questions 22 obtained from co-clicks by users. FIG. 5 illustrates a click graph 70 wherein nodes 71a-c (generally, node 71) corresponds to respective questions Q1-Q3 (22a-c) (generally, question 22), and links 72a-c (generally, link 72) between adjacent nodes 71 indicate that a user has clicked on both linked questions 22. In the illustrated example, with reference to link 72a between node 71a and node 71b with reference to question $Q_1$ 22a and question $Q_2$ 22b, have been 32 co-clicks by one or more users between questions 22 $Q_1$ and $Q_2$. Similarly, with reference to link 72b between nodes 71b and 71c, there have been 48 co-clicks between by one or more users between questions 22 $Q_2$ and $Q_3$, and with reference to link 72c between nodes 71c and 7a1, and sixteen co-clicks by users between questions 22 $Q_1$ and $Q_3$.

Referring back to FIGS. 2 and 4, as seen in operation 110, the computer 58 then performs a clustering operation on the click graph 70 to select one or more seed questions 22' for a particular topic 24. Generally, having multiple seed questions 22' can improve the curating results. A variety of different clustering methods or algorithms can be used to cluster the click graph 70 results. For example, flat or hierarchical clustering may be used to identify seed questions 22'. One particular example that may be used may include the InfoMap MapEquation software package by D. Edler and M. Rosvall (2013). The MapEquation software package is available online, although others may be used. An example of another clustering algorithm that may be implemented includes the Girvan-Newman algorithm which is described in Girvan M. and Newman M. E. J., Community structure in social and biological networks, Proc. Natl. Acad. Sci. USA 99, 7821-7826 (2002). The aforementioned publication is incorporated herein by reference. Each seed question 22' within the cluster relates to the same topic.

Next, as seen in operation 120 of FIG. 4, the computer 58 then takes the one or more seed questions 22' and searches the seed questions 22' against questions contained in the Q&A library 52 to identify additional questions 22 that are related to the topic. The Q&A library 52 is preferably indexed and can be searched using a search program such as, for example, Lucene (Apache Software Foundation). This search is a text based search that looks for similar words contained in the questions 22. In one particular example, a first seed question 22' may be searched against, for example, one million questions to yield a list of twenty (20) similar questions based on common words. This process may be repeated for additional seed questions 22' being searched against the same one million questions. In one aspect of the invention, the questions that are yielded from the search that are common to one or more seed questions 22' can have their respective ranking boosted. Optionally, the search may incorporate one or more expansions searches. In this example, a first seed question 22' may be searched against one million questions to yield a list of twenty (20) similar questions. These twenty (20) similar questions can then be searched separately against the one million questions to yield related questions. As noted above, common questions that are yielded from the searches can have their respective rankings boosted. As a result of this process, there may be thousands of questions related to a single topic.

Still referring to FIG. 4, after the computer 58 has identified the questions 22 related to the topic 24, the computer 58 then clusters the text of the questions 22 into separate clusters under each topic 24. This is seen in operation 130 of FIG. 4. The number of clusters under any given topic may vary and can be chosen depending on the nature of the Q&A library 52. Typically, there may be ten (10) or so clusters under each topic 24 although this may vary from between five (5) and fifteen (15) total clusters. Each cluster may represent, for example, a sub-topic that exists under the main topic 24. In one exemplary method, a term frequency-inverse document frequency (TF-IDF) algorithm can be used. In this algorithm, the text of the questions 22 is converted to vectors. The vectors can then be clustered using a clustering technique such as k-means. The TF-IDF algorithm is a popular method for converting a textual document into a numerical vector to reflect how important a word is to a document in a collection of documents. The TF-IDF value increases proportionally to the number of times a word appears in the document, but is offset by the frequency of the word in the corpus, which helps to control the fact that some words are generally more common than others. Once the text documents are vectorized using TF-IDF, the k-means algorithm can then cluster the real valued vectors. The k-means clustering partitions input vectors into k clusters such that each vector belongs to the cluster with the nearest average.

Table 1 below illustrates an example of two (2) such clusters under the unified topic of "How do we report short options trades?"

TABLE 1

| Cluster 1: #importing, #options transactions | Cluster2 #report, #option trades |
|---|---|
| Is there any way to download automatically options transactions from by brokerage account? | Where do I post option trades? |
| I am having problems importing my financial transactions, what do I do? | How do I report hundreds of option trades? |
| | How do you report FOREX trades? |

After the questions have been clustered into the plurality of clusters under a single topic, the computer 58 can then remove questions that are substantial duplicates from the clusters as seen in operation 140. This can be performed by measuring the Jaccard similarity. In particular, for each cluster, each question can have its Jaccard similarity measured with respect to any prior question. If the Jaccard similarity is higher than a pre-determined threshold value (e.g., 0.4) then that particular question is considered a duplicate and can be flagged or otherwise tagged as a duplicate that can be removed from the cluster or ignored.

Optionally, so-called "dead" questions may also be removed from each cluster. Dead questions may include those questions that have no answers from experienced or qualified "super-users" of the Q&A library 52. Dead questions can also be those questions that have not been clicked on in a long period of time. These can be old or stale questions. Further, dead questions may be those questions that do not have enough up-votes (either in absolute terms or percentage). In many Q&A libraries 52 users may vote a particular question and/or answer either with a positive indication (e.g., up votes) meaning it was helpful or a negative indication meaning it was not helpful (e.g., down votes). Such dead questions can be removed or otherwise ignored.

Finally, in operation 150 of FIG. 4, the computer 58 can generate rich content landing page 20 (e.g., webpage) by aggregating a question 22 from each cluster and placing the same on the landing page 20. For example, if there are ten (10) clusters and a total of twenty five questions 22 are desired to populate a landing page 20, the computer 58 picks a single question 22 from each cluster and iterates through 2½ times until the twenty five questions have been reached. The rich content landing page 20 thus includes these questions 22, all of which relate to a single topic 24. Typically, the landing page 20 will contain between five and thirty questions 22.

While the above-noted method has been described in the context of a single topic 24, it should be understand that this process may occur repeatedly for different topics 24. There may be, for example, thousands of different topics 24 rich content landing pages 20 can be created for each different topic 24 as described above.

Figure 6:
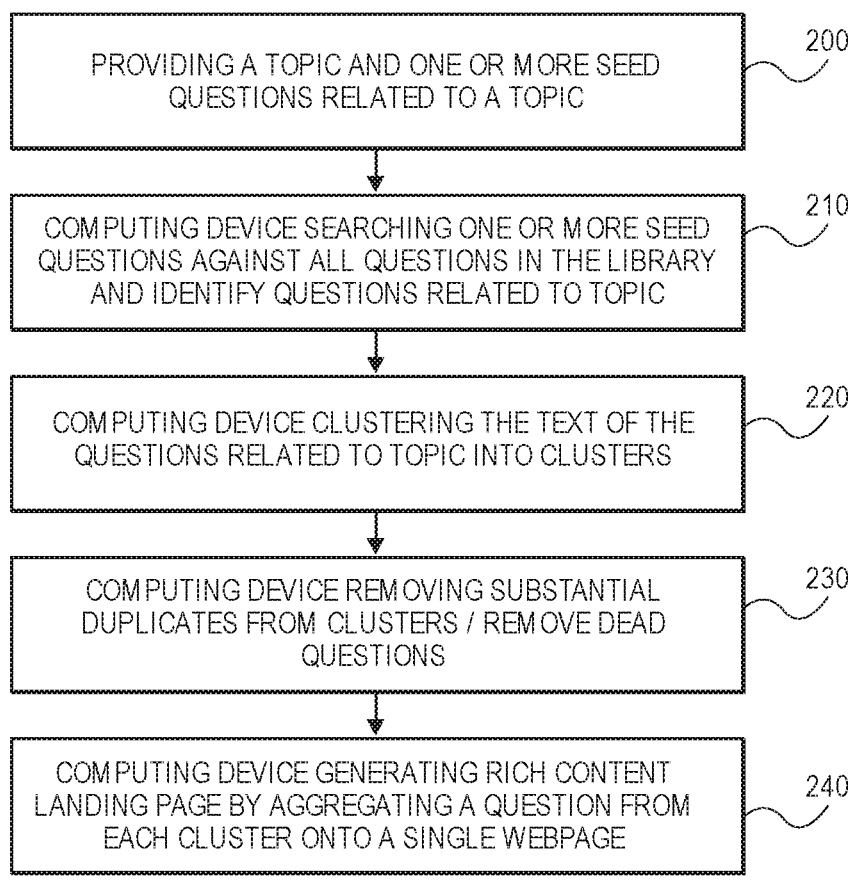
FIG. 6 illustrates a method of auto-curating a Q&A library according to another embodiment.

FIG. 6 illustrates an alternative computer-implemented method of generating rich content webpages 20 from a question and answer library 52 according to one embodiment. In this embodiment, as seen in operation 200, a topic 24 and one or more seed questions 22' related to the topic 24 are provided. Thus, unlike the embodiment illustrated in FIG. 4, there is no clustering of any click graph 70 to identify seed questions 22'. For example, here the topic 24 and seed question(s) 22' can be provided by, for example, a super or expert user. User votes may also be used to establish seed questions 22' (e.g., those questions 22' with a higher positive ranking may be better suited for seed questions 22'). Thus, this portion of the computer-implemented method may use an input that has been manually generated. Of course, a computer-generated topic and associated seed question(s) 22' may also be used in accordance with this embodiment.

In operation 210, the computer 58 then searches the one or more seed questions 22' against all questions 22 in the Q&A library 52 to identify questions related to the topic 24. This operation is the same as described with respect to operation 120 in FIG. 4. Next, in operation 220, the computer 58 clusters the text of the questions 22 into clusters. This operation is the same as operation 130 in the embodiment of FIG. 4. Operation 230 involves the computer 58 removing substantial duplicate questions 22 and/or dead questions 22. This process was described previously as operation 140 in FIG. 4. Finally, in operation 240, the computer 58 generates the rich content landing page 20 by aggregating a question 22 from each cluster onto a single webpage. This operation is the same as operation 150 described herein in the embodiment of FIG. 4.

As one option to be used as part of the method of generating rich content landing pages 20 from a question and answer library 52, questions within a cluster or clusters may be tagged 23 as being product related (e.g., questions that pertain to TURBOTAX tax return preparation software program) or they be tagged 23 as general tax questions 22. Users may be directed to a sub-set of landing pages 20 that are specific to product related questions 22 or, alternatively, users may be directed to more general tax questions 22. U.S. patent application Ser. No. 14/216,675, which is incorporated herein by reference, describes a system for managing social based questions and answers based on whether the Q&As relate to products or general tax questions.

In one alternative configuration, the methods of generating rich content landing pages 20 may incorporate user votes of a question 22 (e.g., thumbs up or thumbs down vote) into the process of populating the landing pages 20. For example, when the computer 58 is extracting questions 22 from each cluster under a particular topic 24 to populate the landing page 20, those questions 22 with a higher vote count or ranking (whether absolute or percentage based) may first populate the landing page 20. In this way, user votes are taken into account to create the rich content. Likewise, in some embodiments, the quality of answer 25 that is associated with a question 22 may also be taken into account when populating a landing page 20. Those Q&A pairs with a high quality level may be given priority within a cluster to be extracted and aggregated within a landing page 20. The '675 Application, which is incorporated by reference herein, describes various ways of assessing and quantifying answer 25 quality.

Figure 7:
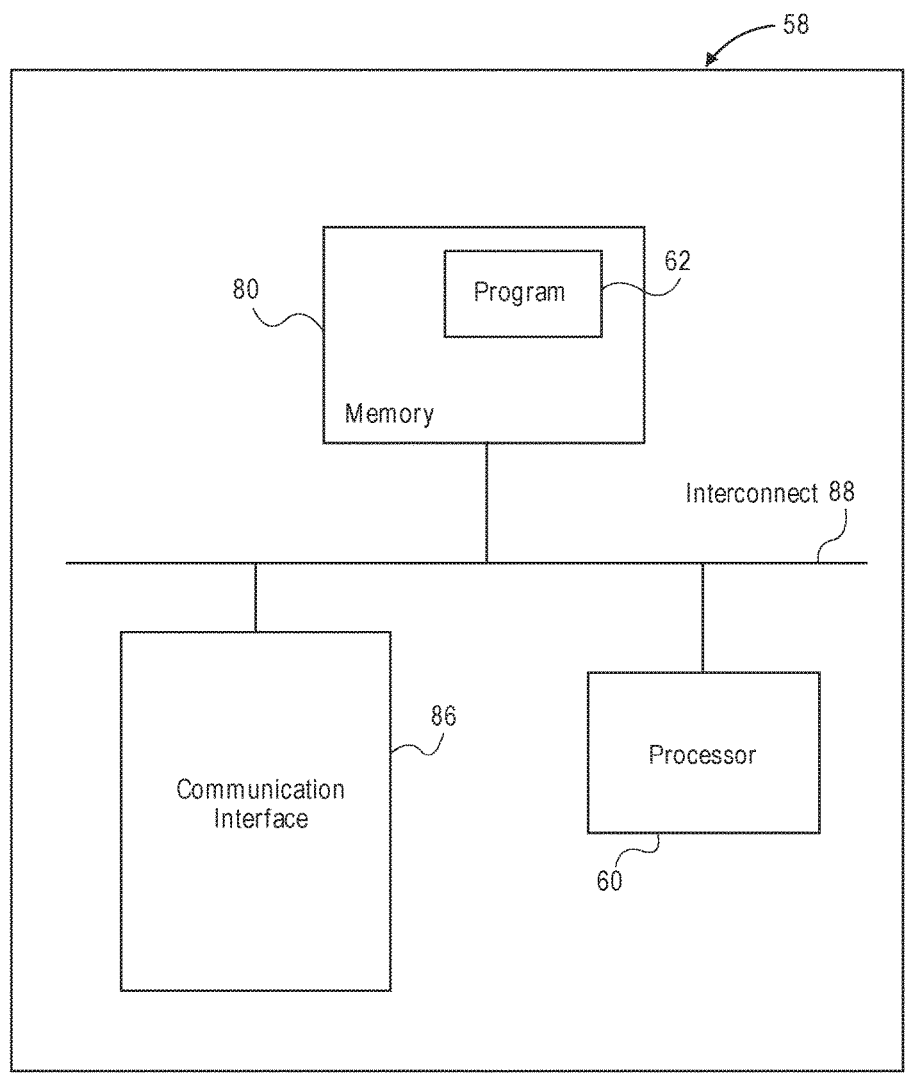
FIG. 7 illustrates components of a computing device such as computer or other computing device that may be utilized to execute software for the auto-curation method.

FIG. 7 generally illustrates components of a computing device such as computer 58 or other computing device that may be utilized to execute software for the auto-curation method that includes a memory 80, program instructions 62, a processor or controller 60 to execute program instructions 62, a network or communications interface 86, e.g., for communications with a network or interconnect 88 between such components. The memory 80 may be or include one or more of cache, RAM, ROM, SRAM, DRAM, RDRAM, EEPROM and other types of volatile or non-volatile memory capable of storing data. The processor unit 60 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 88 may include a system bus, LDT, PCI, ISA, or other types of buses, and the communications or network interface may, for example, be an Ethernet interface, a Frame Relay interface, or other interface. The interface 86 may be configured to enable a system component to communicate with other system components across a network which may be a wireless or various other networks. It should be noted that one or more components of computing device may be located remotely and accessed via a network. Accordingly, the system configuration illustrated in FIG. 7 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium.

Examples of carriers include, but are not limited to, a floppy diskette, a memory stick or a flash drive, CD-R, CD-RW, CD-ROM, DVD-R, DVD-RW, or other carrier now known or later developed capable of storing data. The processor 60 performs steps or executes program instructions 62 within memory 80 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method of automatically generating rich content landing webpage for a question and answer (Q&A) website, the computer-implemented method comprising:

analyzing, by a computing device including a processor executing computer-executable instructions and in communication with a database hosting a Q&A library and in communication through respective networks with a server that serves respective webpages to respective computers of respective users in response to respective requests submitted through a search engine, respective user click histories of questions contained within the Q&A library;

generating, by the computing device, a click graph comprising related questions obtained from co-clicks by users as determined by analyzing the click history;

clustering, by the computing device, the click graph;

selecting, by the computing device, a plurality of seed questions from the clustered click graph, wherein said selection corresponds to a plurality of seed questions related to a common topic;

searching, by the computing device, the seed questions against a set of questions stored in the Q&A library;

identifying, by the computing device, questions related to the common topic based on common words found in the one or more seed questions;

clustering, by the computing device, the text of the questions related to the common topic into a plurality of clusters under the common topic, wherein each cluster represents a different sub-topic of the common topic;

comparing, by the computing device, the text of at least one of the questions to the text of at least another one of the questions;

determining, by the computing device, that the at least one of the questions is a substantial duplicate of the at least another one of the questions based on the comparing indicating that the at least one of the questions has a textual similarity to the at least another one of the questions above a predetermined textual similarity threshold;

removing, by the computing device, the at least one substantial duplicate from the plurality of clusters;

selecting, by the computing device, a separate question from each cluster after the at least one substantial duplicate has been removed; and automatically generating, by the computing device, a rich content landing webpage for the Q&A website, the automatically generated rich content landing webpage displaying each selected separate question on a single webpage containing the common topic, the automatically generated rich content landing webpage being presented through a display of a user computer in response to a user search request associated with the common topic.

2. The computer-implemented method of claim 1, wherein the Q&A library comprises a plurality of tax-related questions.

3. The computer-implemented method of claim 1, wherein the seed questions are selected at least in part on user votes.

4. The computer-implemented method of claim 1, wherein the method of generating rich content webpages is performed periodically on the Q&A library.

5. The computer-implemented method of claim 1, wherein the method of generating rich content webpages is performed dynamically on the Q&A library.

6. The computer-implemented method of claim 1, further comprising tagging each of the plurality of clusters under the common topic as product-related or tax-related.

7. The computer-implemented method of claim 6, wherein the rich content webpage contains only product-related questions.

8. The computer-implemented method of claim 6, wherein the rich content webpage contains only tax-related questions.

9. The computer-implemented method of claim 1, wherein after the computing device searches the seed questions against the set of questions in the Q&A library and identifies questions related to the common topic, the computing device ranks the identified questions related to the common topic based on top matches.

10. The computer-implemented method of claim 1, wherein the plurality of clusters under the common topic includes five to fifteen clusters.

11. The computer-implemented method of claim 1, wherein the single webpage containing the common topic includes five to thirty questions.

12. The computer-implemented method of claim 1, wherein the automatically generated rich content landing webpage is more likely to have a higher ranking by the search engine.

13. The computer-implemented method of claim 12, wherein the automatically generated rich content landing webpage is more prominently displayed to users of the search engine by appearing higher on a list of search results generated in response to a query submitted through the search engine.

* * * * *